(12) United States Patent
Zachos (10) Patent No.: US 8,880,654 B2
(45) Date of Patent: Nov. 4, 2014

(54) PROTOCOL ADAPTER FOR PASSING DIAGNOSTIC MESSAGES BETWEEN VEHICLE NETWORKS AND A HOST COMPUTER

(75) Inventor: Mark P. Zachos, West Bloomfield, MI (US)

(73) Assignee: Dearborn Group, Inc., Farmington Hills, MI (US)

( * ) Notice: Subject to any disclaimer, the term of this patent is extended or adjusted under 35 U.S.C. 154(b) by 130 days.

(21) Appl. No.: 13/343,055

(22) Filed: Jan. 4, 2012

(65) Prior Publication Data

US 2013/0173751 A1  Jul. 4, 2013

(51) Int. Cl.
*G06F 15/16* (2006.01)
(52) U.S. Cl.
USPC .......................................................... 709/219

(58) Field of Classification Search
CPC ................................................... H04N 21/2143
USPC .......................................................... 709/219
See application file for complete search history.

(56) References Cited

U.S. PATENT DOCUMENTS

| | | | |
|---|---|---|---|
| 5,204,955 A * | 4/1993 | Kagei et al. ..................... 714/55 |
| 6,526,340 B1 * | 2/2003 | Reul et al. ..................... 701/29.3 |
| 6,772,248 B1 | 8/2004 | McClure et al. | |
| 7,337,245 B2 | 2/2008 | McClure et al. | |
| 7,725,630 B2 | 5/2010 | McClure et al. | |
| 8,032,668 B2 | 10/2011 | McClure et al. | |
| 2005/0234616 A1* | 10/2005 | Oliver et al. .................... 701/33 |
| 2009/0276115 A1* | 11/2009 | Chen .............................. 701/32 |
| 2011/0314191 A1 | 12/2011 | McClure et al. | |

* cited by examiner

*Primary Examiner* — Yves Dalencourt
(74) *Attorney, Agent, or Firm* — Warn Partners, P.C.

(57) ABSTRACT

A protocol adapter for transferring diagnostic messages between networks within a vehicle and a host computer. The protocol adapter operates as a voltage translator to support J1708 software. The protocol adapter also recognizes when the protocol adapter is connected to a host computer running the J1939 and/or J1708 protocols and automatically switches to that protocol.

35 Claims, 11 Drawing Sheets

PROTOCOL ADAPTER FOR PASSING DIAGNOSTIC MESSAGES BETWEEN VEHICLE NETWORKS AND A HOST COMPUTER

BACKGROUND OF THE INVENTION

1. Field of the Invention

This invention relates generally to a protocol adapter for passing diagnostic messages between networks within a vehicle and a host computer and, more particularly, to a protocol adapter for passing diagnostic messages between networks within a vehicle and a host computer, where the protocol adapter includes a pass-through mode of operation where the protocol adapter emulates legacy protocol adapters so that state of the art host computers can communicate with the vehicle networks using obsolete software.

2. Discussion of the Related Art

Vehicles employ various networks and systems for diagnostics, analysis and monitoring of vehicle systems. These various networks are generally selectively connectable to an external host computer so that the operation of the vehicle networks can be monitored by an external system. These vehicle systems and networks operate under various protocols, such as the J1708 and the J1939 protocols. Protocol adapters are known in the art that allow the host computer to communicate with the vehicle networks through the protocols.

One known type of protocol adapter for this purpose is the J1708 protocol adapter. The first generation of the J1708 protocol adapter used for diagnostic purposes included a voltage translator with a built-in-timer circuit that flagged the end of a message. This protocol adapter design worked well for J1708 protocols because it and the standard serial communication port of the host computer were based on universal asynchronous receive and transmit (UART) technology having different physical interfaces, i.e., different voltages. The timer circuit was needed to allow the host computer to recognize the end of message as defined by the J1708 protocol. Most host computers, however, did not have adequate resources to comply with the rigid timing requirements needed for end of message detection.

A second generation protocol for vehicle diagnostics purposes is the J1939 protocol. With the J1939 protocol, there was no longer a basic compatibility between the known host computer serial communication port and the J1939 protocol. It therefore became necessary for protocol adapters to use microprocessors in their diagnostic tools. These microprocessors would receive an entire message from one of the supported links, and do message validation, including end of message detection. The microprocessor would then forward the message on to the appropriate communication channel if it did not detect an error. This alleviated the need for the timer to detect the end of message, but also added an inherent delay between the vehicle data link and the host computer serial communication port.

The J1939 protocol required that software had to be matched to the diagnostic tool for which it was written. Obsolete software had to be paired with legacy hardware, and new software had to be paired with new hardware. This required that each diagnostic shop own and maintain several diagnostic tools. It would be desirable to have a protocol adapter that could operate as an old voltage translator to support obsolete software using the J1708 protocol, and recognize when the protocol adapter is connected to a host computer running new software to automatically switch to the J1939 protocol.

SUMMARY OF THE INVENTION

In accordance with the teachings of the present invention, a protocol adapter is disclosed for transferring diagnostic messages between networks within a vehicle and a host computer. The protocol adapter operates as a voltage translator to support J1708 software. The protocol adapter also recognizes when the protocol adapter is connected to a host computer running the J1939 and/or J1708 protocols and automatically switches to that protocol.

In one embodiment, the protocol adapter includes a control area network (CAN) transceiver circuit that provides an interface between the vehicle network and the host computer when the vehicle network is operating in a J1939 protocol and a J1708 transceiver that provides an interface between the vehicle network and the host computer when the vehicle network is operating in a J1708 protocol. The J1708 transceiver circuit includes a voltage translator for translating the voltage of the J1708 protocol signals. The protocol adapter further includes a static random access memory (RAM) circuit that provides temporary data storage and is connected to the CPU through data and address channels, a flash memory module that provides permanent storage of application data and loader application information, and a universal asynchronous receive and transmit (UART) circuit that provides communication of asynchronous data to and from the host computer.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a protocol adapter for transferring both J1708 and J1939 protocol diagnostic messages between networks within a vehicle and a host computer is merely exemplary in nature, and is in no way intended to limit the invention or its applications or uses.

Figure 1:
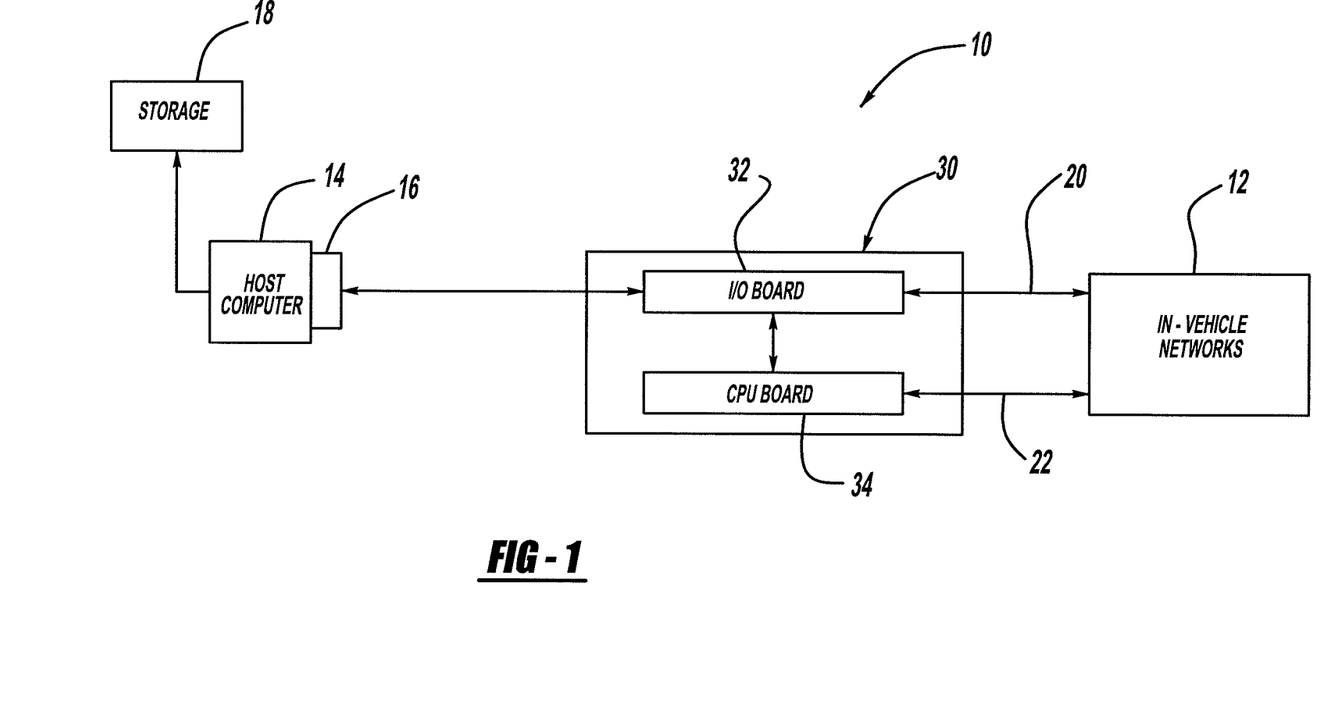
FIG. 1 is a block diagram of a protocol adapter system, according to an embodiment of the present invention, that transfers both J1708 and J1939 signals between a host computer and a vehicle network.

FIG. 1 is a block diagram of a system 10 for transferring diagnostic signals between vehicle networks 12 in a vehicle to an external device 14, which in this embodiment is an external host computer 14, through a protocol adapter 30. Such diagnostic messages can be any signals for monitoring any suitable vehicle network within the vehicle for diagnostics and/or maintenance purposes, as would be well understood to those skilled in the art. The host computer 14 represented in FIG. 1 can be any host computer known in the art used for this purpose, including state of the art host computers and obsolete host computers. Additionally, the external device 14 is not limited to the host computer 14 shown in FIG. 1, the external device 14 could also be a Personal Digital Assistant (PDA), a cellular phone, a laptop computer, another protocol adapter, or any other device where it is desired to transfer information from the vehicle networks 12 to an external device 14. In this embodiment, the host computer 14 includes a port 16 that provides an interface to the host computer 14. The port 16 can be in the form of an RS-232 I/O port for providing an RS-232 interface with the host computer 14. The port 16 can also take the form of a Universal Serial Bus (USB) port, Ethernet, a wireless interface, or any other type of device suitable for providing communication and data transmission with the host computer 14.

When used in the form of an RS-232 port 16, the RS-232 port 16 provides direct access to the J1708/RS-485 link. The signals received and analyzed by the host computer 14 can be stored in any suitable storage device 18, such as a display or magnetic tape. The signals used by the vehicle networks 12 can be of any particular vehicle protocol, including the J1708 protocol provided on line 20 and the J1939 protocol provide on line 22.

According to the invention, the protocol adapter 30 is compatible for other protocols besides the J1708 protocol and the J1939 protocol. The protocol adapter 30 is also compatible with J1850, FlexRay, LIN/J2602, ISO 9149-2, ISO 1941-1989, ISO 1941 Special Protocol, SAE J2284 Dual Wire CAN, and SAE J2411 Single Wire CAN Protocol. The protocol adapter 30 provides a "pass-through" interface so that various compliant applications from various developers can use any of the unique developer applications. This allows all compliant software applications and hardware interface adapters to be interchangeable. The protocol adapter 30 is capable of performing electronic control module (ECM) emulation, analysis of network message loading, simulation of message traffic loading of an in-vehicle network, inventory management, ECM code testing, a gateway between networks and vehicle maintenance status checks. The protocol adapter 30 is also capable of performing prognostic functions, such as data monitoring to prevent failure. This is accomplished by gathering vehicle network messages, and monitoring the vehicle network messages of the in-vehicle network.

In addition to being compatible with various types of protocols, the protocol adapter 30 is also capable of operating multiple channels simultaneously. The protocol adapter 30 can also act as a multiplexer and have multiple inputs to a single output, a single input to multiple outputs, or any combination therebetween. For example, the protocol adapter 30 could receive input from two vehicle networks 12, and send the output from the both vehicle networks 12 to three external devices 14. This is one example of use for the protocol adapter 30 of the present invention; the protocol adapter 30 could also be used to transfer information from more or less than two vehicle networks 12 to more or less than three external devices 14.

The protocol adapter 30 also has the ability to provide a streaming data collection function, where the protocol adapter 30 logs and transfers data simultaneously. This function is useful for preventing the loss of data. For instance, the protocol adapter 30 will record data as the data is received from one or more of the vehicle networks 12, while simultaneously transferring the data to the external device 14. The external device 14 will record the data as well. However, in case the transmission of data between the protocol adapter 30 and the external device 14 some how becomes lost, for example a USB cable becomes disconnected from the port 16, or a wireless transmission fails, the data saved by the protocol adapter 30 can be transferred to the external device 14 once the connection between the protocol adapter 30 and the external device 14 is reestablished.

The protocol adapter 30 includes an I/O sub-assembly board 32 and a CPU sub-assembly board 34, both of which will be described in detail below. When the vehicle networks 12 use the J1708 protocol, the protocol adapter 30 can operate in a pass-through mode where the J1708 signals on the line 20 are passed through a voltage translator directly to an RS-232 transceiver in the I/O board 32. With the J1708 protocol, the protocol adapter 30 can also operate under the control of an embedded processor where the J1708 signals on the line 20 are passed through a voltage translator to be processed in the CPU board 34 and routed to an RS-232 transceiver (discussed below) in the I/O board 32. If the vehicle networks 12 are using the newer J1939 protocol, the J1939 signals on the line 22 are processed in the CPU board 34 to provide the J1939 compatibility.

Figure 2:
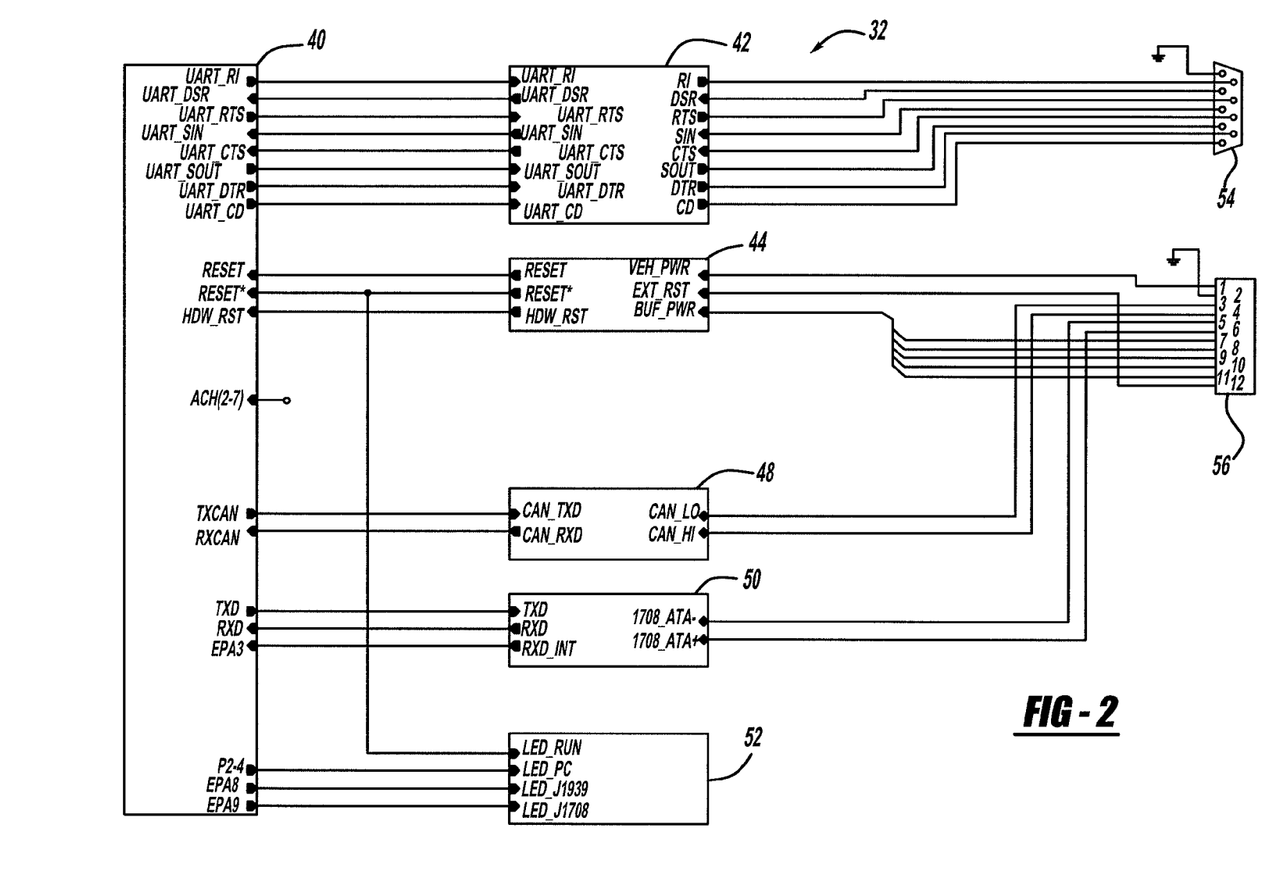
FIG. 2 is a schematic block diagram of an input/output (I/O) board in the protocol adapter shown in FIG. 1.

The I/O board 30 and the CPU board 34 use the following list of signals:

ACH[2.7]-inputs for the analog/digital converter
RESET*-active low signal issued to reset the processor
READY-signal used to lengthen memory cycles for slow memory -continued RD*-active low signal used for external memory reads
WRH*-active low signal used to designate high-byte writes
WR*-active low signal used for external writes
EXTINT-designates an external interrupt
AD[0.15]-address data lines to transfer between the processor and memory
LA[0.15]-latch address used to latch the desired memory bytes
EPA3-input/output for high speed capture/compare channels
EPA8-input/output for high speed capture/compare channels
EPA9-input/output for high speed capture/compare channels
SC0-clock pin for SSIO0
SD0-data pin for SSIO0
SC1-clock pin for SSIO0
SD1-data pin for SSIO0
P2.4-standard bi-directional ports for data transfer
TXD-used to transmit serial data
RXD-used to receive serial data
TXCAN-used to transmit CAN signal
RXCAN-used to receive CAN signal
A[9.15]-high level address for selecting large byte operations
HDW_RST*-active love hardware reset
FLASH_UPPER-FLASH upper byte
FLASH_CS*-active low enable FLASH chip select
RAM_CS*-active low enable RAM chip select
UART_CS*-active low enable UART chip select
D[0.15]-data signal used to transfer data bi-directionally between the processor and memory
A[1.15]-address signal used to select the desired memory allocation area
CE*_LOWER-active low chip enable for lower byte
DE*_LOWER-active low data enable for lower byte
WE*_LOWER-active low write enable for lower byte
CE*_UPPER-active low chip enable for upper byte
DE*_UPPER-active low data enable for upper byte
WE*_UPPER-active low write enable for upper byte
FLASH_UPPER-FLASH upper byte write enable
FLASH_CE*-active low FLASH chip enable
FLASH_DE*-active low FLASH data enable
FLASH_WE*-active low FLASH write enable
A[1.3]-address signal used to select the desired allocation area
D[0.7]-data signal used to transfer data bi-directionally between the processor and memory
CS*-active low chip select
RESET-signal used for reset
INTR-interrupt line to processor
SOUT-data out
DTR*-active low enable data terminal ready
RTS*-active low enable ready to send
MBAUD-used to set the processor in high speed mode. Unused in this application.
SIN-data in
DSR*-active low enable data set ready
CTS*-active low enable clear to send
EPA3-input/output for high speed for capture/compare channels
EPA8-input/output for high speed for capture/compare channels
EPA9-input/output for high speed for capture/compare channels
P2.4-PC LED control
UART_SOUT-UART data out
UART_DTR*-active low enable UART data terminal ready
UART_RTS*-active low enable UART ready to send
UART_SIN-UART data in
UART_DSR*-active low enable UART data set ready
UART_CTS*-active low enable UART clear to send FIG. 2 is a schematic block diagram of the I/O board 32. The (I/O) board 32 includes an external I/O interface circuit 40, an RS-232 transceiver circuit 42, a power supply regulator circuit 44, a controller area network (CAN) transceiver circuit 48 for the J1939 protocol, a J1708 transceiver circuit 50 including a voltage translator, an LED indicator circuit 52 and input and output ports 54 and 56 interconnected as shown. The external I/O interface circuit 40 provides the interface connection between the various circuits in the I/O board 32 and the connections to the host computer 14 and the vehicle networks 12. The RS-232 transceiver circuit 42 provides an RS-232 interface between the vehicle networks 12 and the host computer 14.

Figure 3:
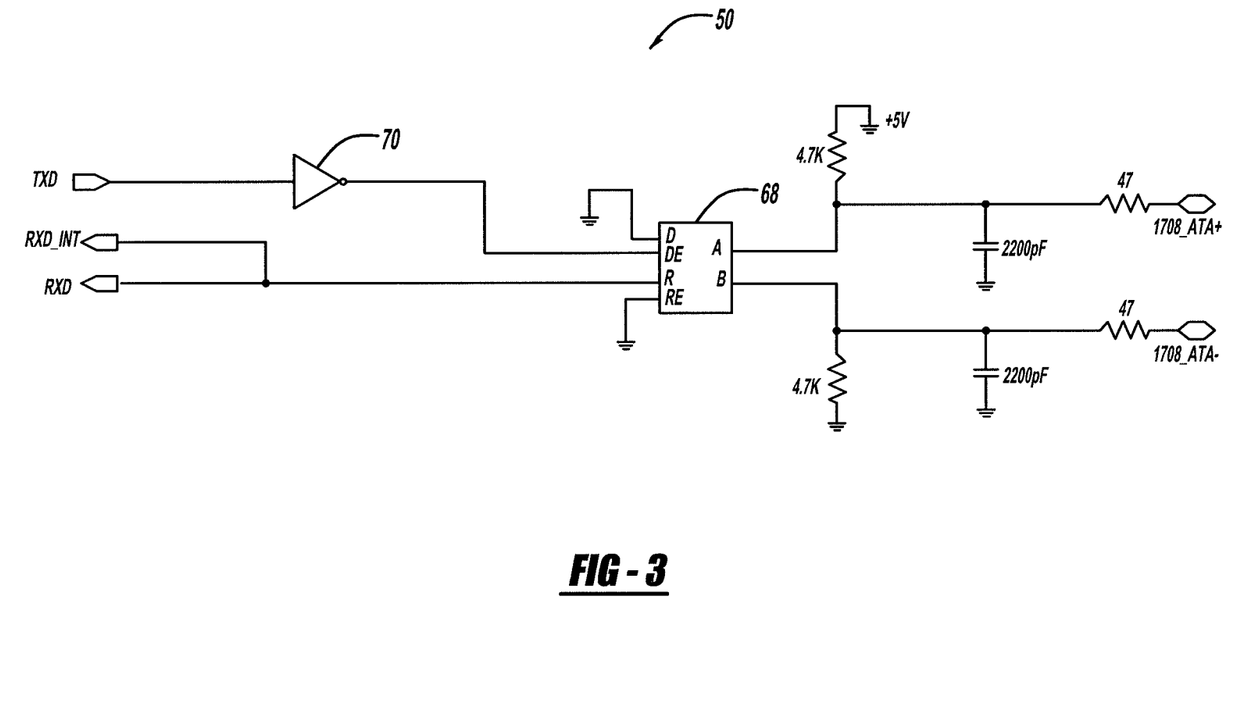
FIG. 3 is a schematic diagram of a J1708 transceiver circuit in the I/O board shown in FIG. 2.

The CAN transceiver circuit 48 provides a CAN interface between the vehicle networks 12 and the host computer 14 when the vehicle networks 12 are operating in the J1939 protocol. In one embodiment, the CAN transceiver is the model P82C251T, well known to those skilled in the art. The J1708 transceiver circuit 50 provides the J1708 protocol interface between the vehicle networks 12 and the host computer 14. FIG. 3 is a schematic diagram of the J1708 transceiver circuit 50 and includes a voltage translator 68 and an input buffer 70 electrically interconnected, as shown. In one embodiment, the voltage translator 68 is the model SN75176, well known to those skilled in the art.

Both the transceiver circuits 48 and 50 include transmit mailboxes for transmitting J1708 and J1939 messages to the networks 12 and receive mailboxes for receiving J1708 and J1939 messages from the networks 12. The protocol adapter 30 allows the user to customize each transmitted message. The J1708 or J1939 message to be transmitted may include the relative time to the adapter timer, when the message transmission is to begin, the number of times the message is to be sent, the desired time interval between transmissions, the ID and data to be sent, the conditions for a call back announcing a successful transmission, the number of times the message should be sent before auto-deletion occurs, and whether to enable a call back announcing the time of message deletion. The J1708 or J1939 message received may include which protocol to scan, which bits should be masked by hardware-level filtering, which bits should be matched by hardware-level filtering, what information, such as mailbox number, time stamp, identifier, length of data, etc., should be sent to the host immediately upon receipt, and how the application will be notified when a message is received, such as transparent update, receive call back, polling, etc.

Figure 4:
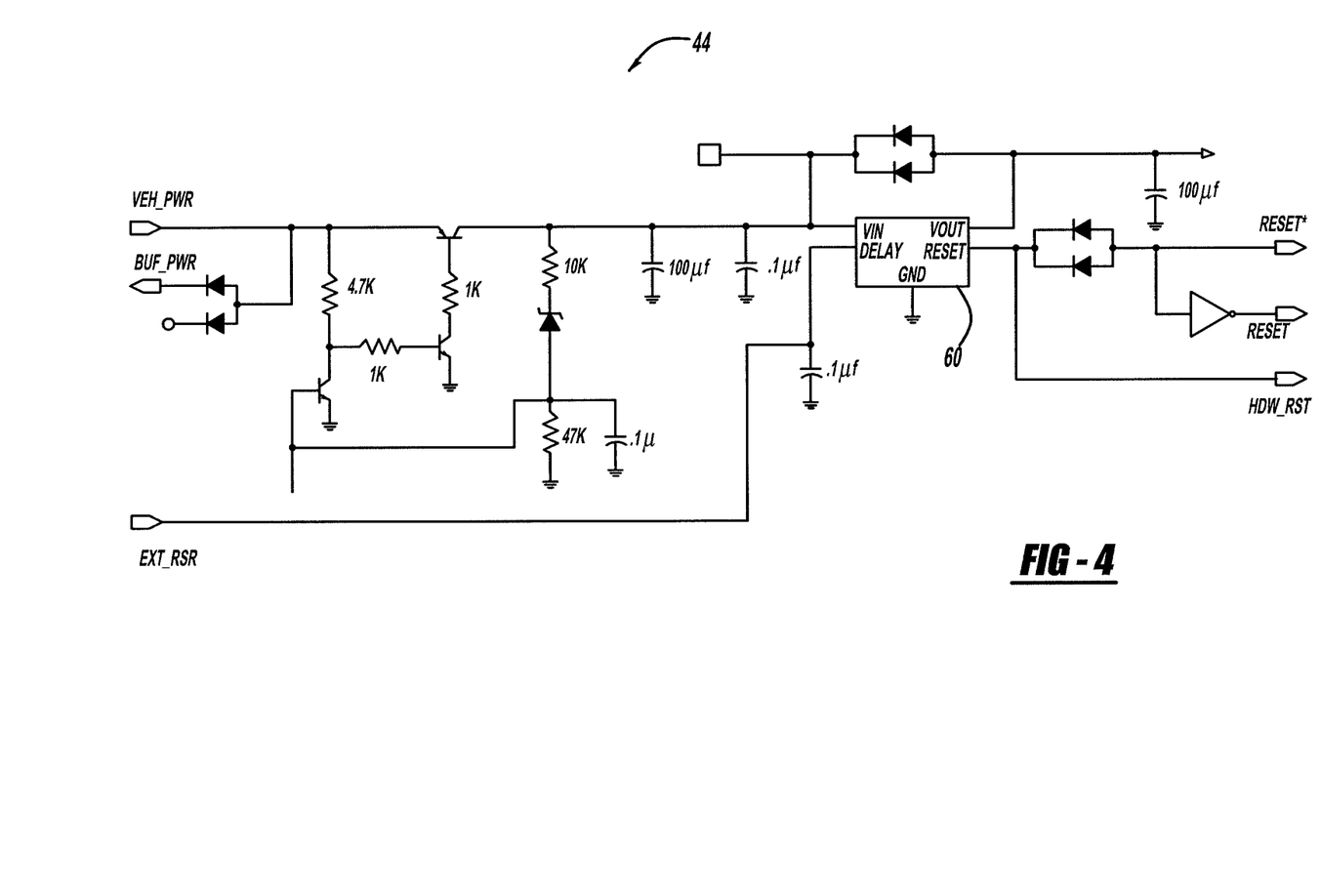
FIG. 4 is a schematic diagram of a power supply regulator circuit in the I/O board shown in FIG. 2.

FIG. 4 is a schematic diagram of the power supply regulator circuit 44 and includes a voltage regulator 60 interconnected with other circuit elements, as shown. The power supply regulator circuit 44 converts a vehicle battery voltage to a regulated 5V DC for operation of the adapter 30.

Figure 5:
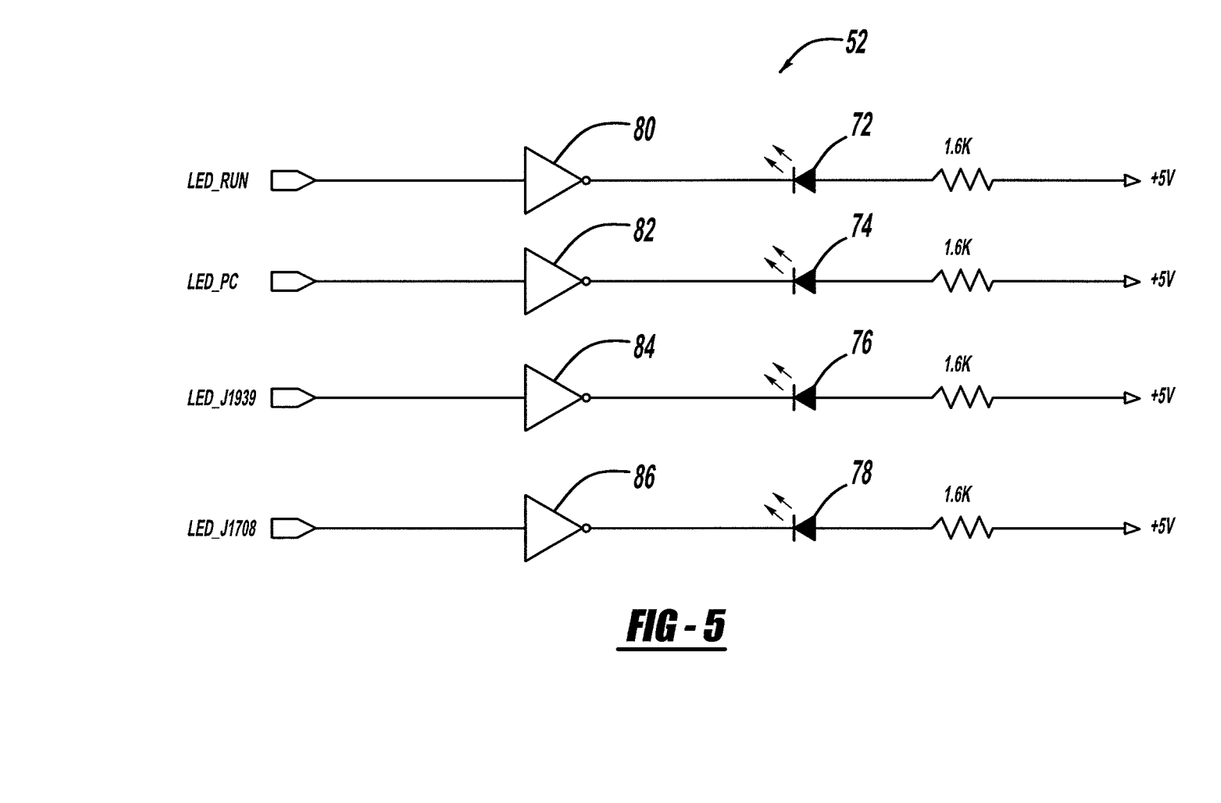
FIG. 5 is a schematic diagram of an LED indicator circuit in the I/O board shown in FIG. 2.

FIG. 5 is a schematic diagram of the LED circuit 52. The LED circuit 52 includes four LED control lines coupled to four LEDs 72, 74, 76 and 78 through input buffers 80, 82, 84 and 86, respectively. In this embodiment, the LED 72 indicates that the protocol adapter 30 is being powered, the LED 74 indicates a link to the port 16 of the host computer 14, the LED 76 indicates that the protocol adapter 30 is operating in the J1939 protocol and the LED 78 indicates that the protocol adapter 30 is operating in the J1708 protocol.

Figure 6:
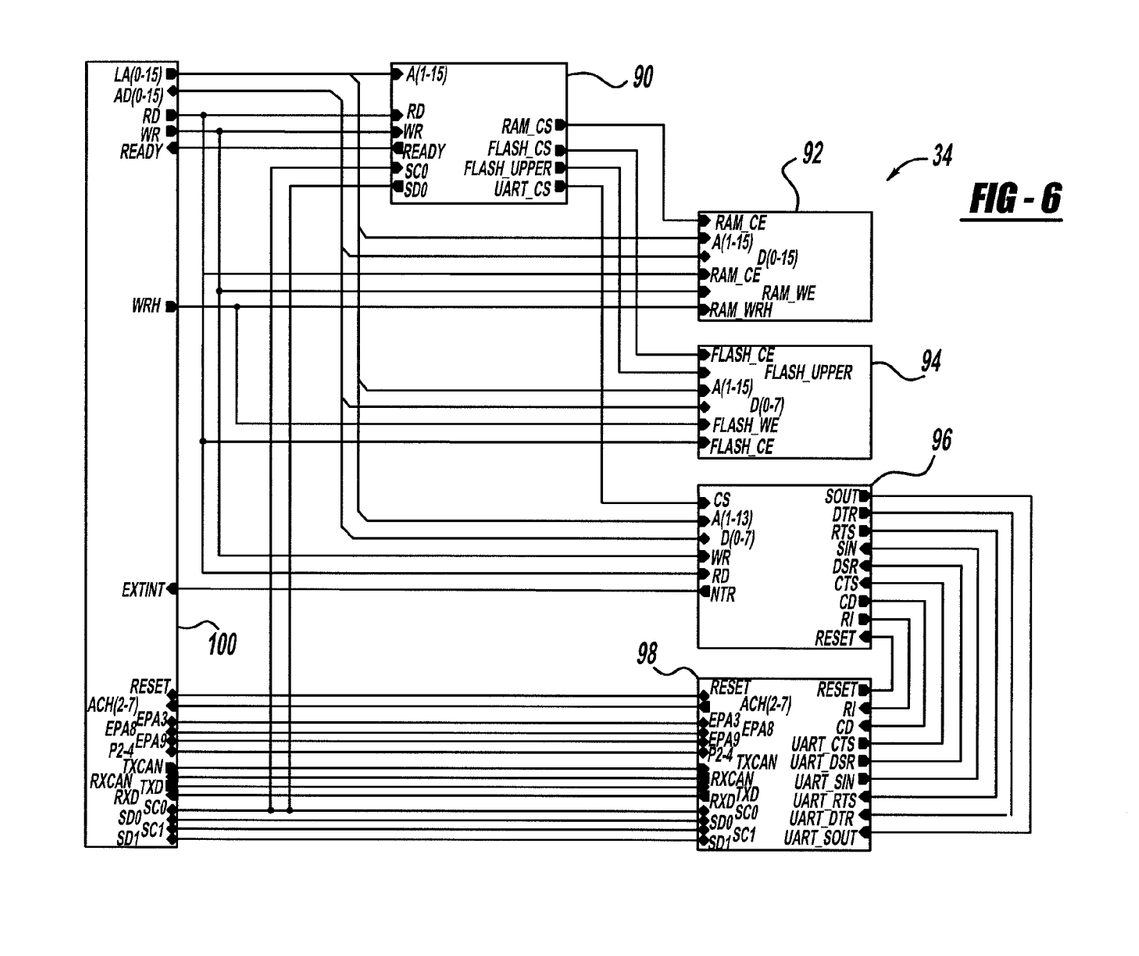
FIG. 6 is a schematic block diagram of a central processing unit (CPU) board in the protocol adapter shown in FIG. 1.

FIG. 6 is a schematic block diagram of the CPU board 34. The CPU board 34 includes a CPU 100, a device decoder circuit 90, a static RAM circuit 92, a flash memory module 94, a UART circuit 96 and a CPU I/O interface circuit 98 electrically interconnected as shown. The flash memory module 94 is used for program storage. The module 94 is responsible for the permanent storage of the application data and loader application information. The module 94 allows the protocol adapter 30 to be updated with new firmware in the field. The uploaded firmware is stored in the RAM circuit 92.

The UART circuit 96 is used for communication of asynchronous data to and from the programmable controller 14. The UART circuit 96 is used to convert parallel data from the CPU 100 to serial data to the host computer 14, and vice versa.

Figure 7:
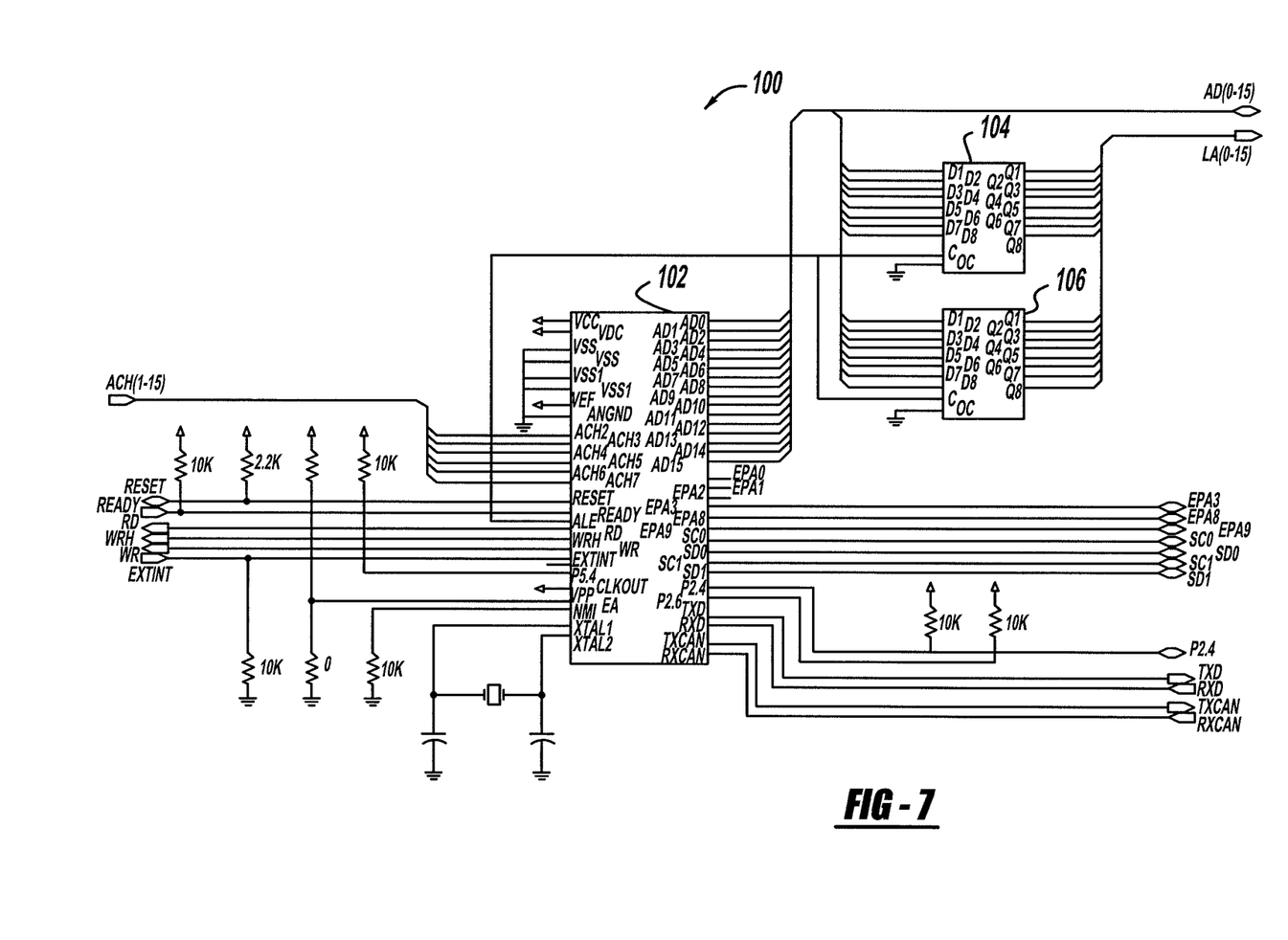
FIG. 7 is a schematic diagram of the central processing unit in the CPU board shown in FIG. 6.

FIG. 7 is a schematic diagram of the CPU 100, and includes a microprocessor 102 and two input/output chips 104 and 106 electrically coupled as shown. In this embodiment, the microprocessor 102 is the model 87C196CA and the chips 104 and 106 are the model 74HC573. In the pass through mode, the microprocessor 102 delivers data directly to the J1708 transceiver circuit 50 to the RS-232 transceiver circuit 42, and monitors the data so as to provide the J1708 defined timing signals on any or all of the RS-232 hardware handshake signals.

Figure 8:
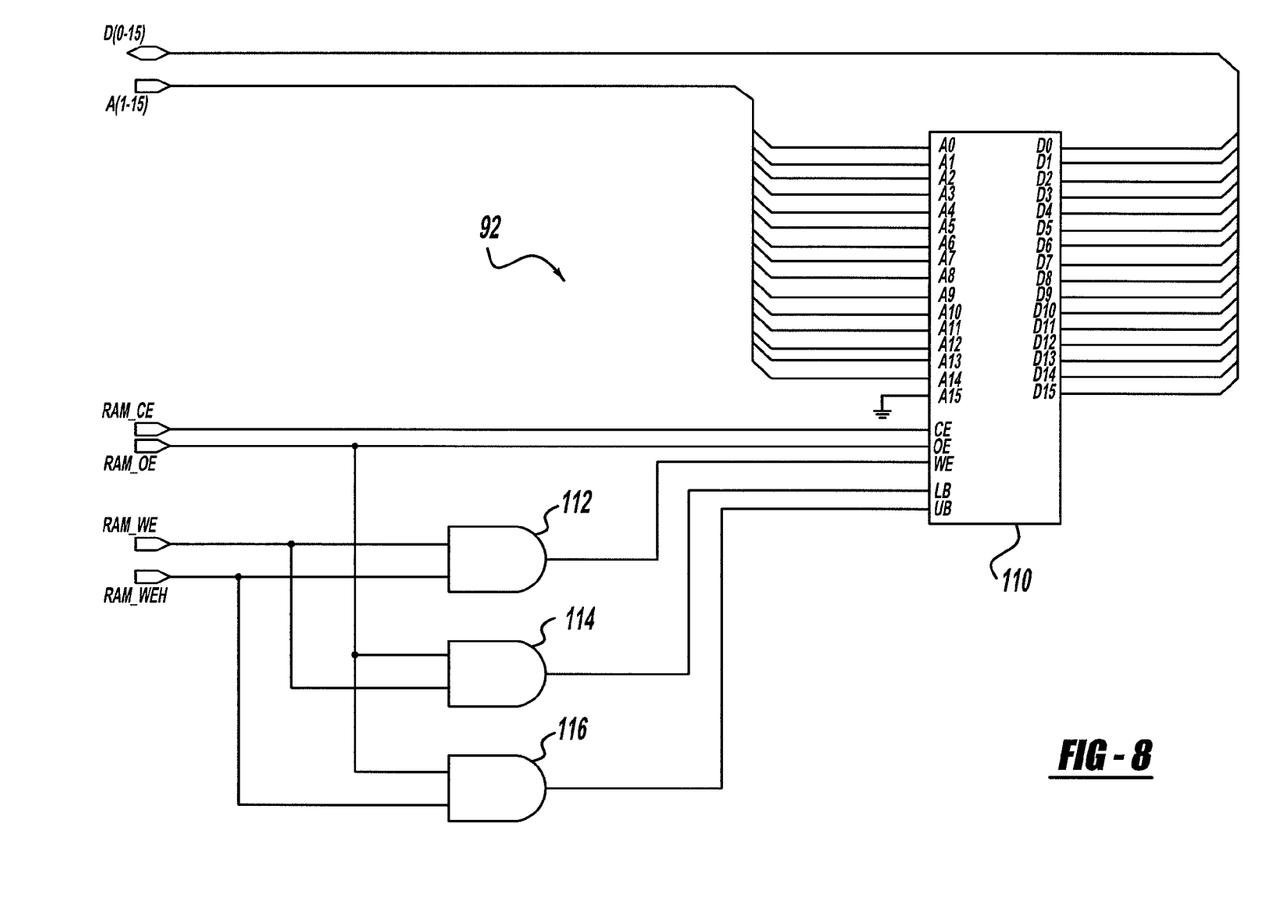
FIG. 8 is a schematic diagram of a static memory module circuit in the CPU board shown in FIG. 6.

FIG. 8 is a schematic diagram of the static RAM circuit 92, and includes a memory chip 110 and AND gates 112, 114 and 116 electrically interconnected as shown. In one embodiment, the memory chip 110 is the model TC551664BJ-20, well known to those skilled in the art. The memory chip 110 is used for temporary data storage and is connected to the CPU 100 through the data and address channels. Once a memory allocation area is specified through the address channel, data can be read or written through the data channel. Data signals D(0-15) are used to transfer data bi-directionally between the CPU 100 and the memory chip 110. Address signals A(1-15) are used to select the desired memory allocation area in the memory chip 110.

The static RAM circuit 92 provides space reserved in the adapter's memory for the temporary storage of data for the transmit and receive mailboxes. The static RAM circuit 92 provides flexibility for transmitting and receiving messages, regardless of the J1708 or J1939 vehicle protocol, by providing a temporary message storage location, redirection of mailbox data, storage for oversized messages, such as J1939 transport protocol messages, and the concatenation of small messages.

Sometimes both the J1708 and the J1939 protocols transmit oversized messages. A normal J1708 message may be up to 21 bytes long. However, special modes may utilize longer messages. The protocol adapter 30 accommodates these oversized messages by putting the J1708 mailbox into extended mode and attaching it to a location in the static RAM circuit 92. The J1939 transport layer also makes use of the RAM circuit 92 to ensure that transport timing requirements are met. The storing of multiple messages in the static RAM circuit 92 reduces multiple reads and writes to the adapter hardware. The concatenation of these short messages reduces the overhead on the serial port. The static RAM circuit 92 allows users to replace legacy hardware with an interface that can support existing software. Consequently, users can replace legacy hardware with the protocol adapter 30 and maintain compatibility with their original software.

Figure 9:
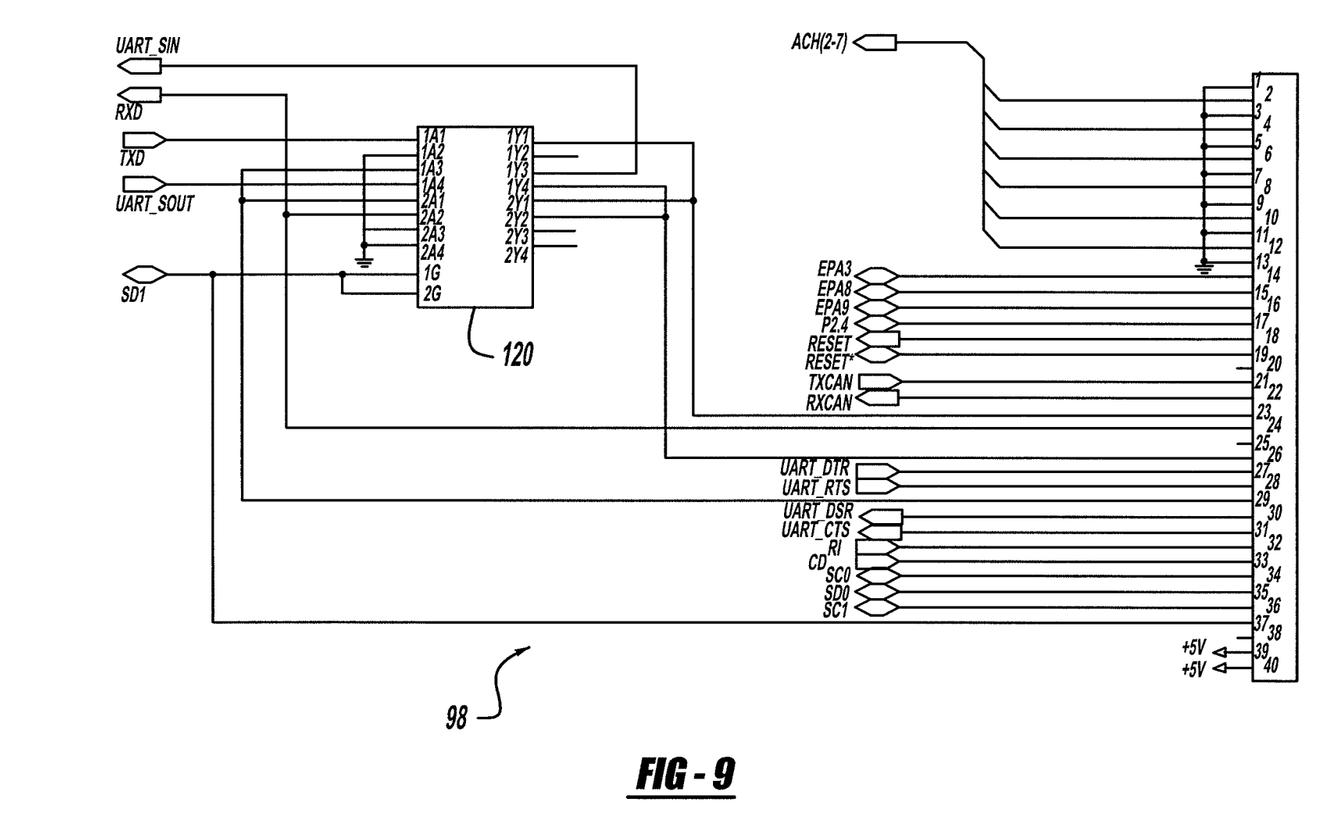
FIG. 9 is a schematic diagram of an I/O interface connector circuit in the CPU board shown in FIG. 6.

FIG. 9 is a schematic diagram of the CPU I/O interface circuit 98, and includes an interface chip 120. In one embodiment, the interface chip 120 is the model 74HC241. The interface circuit 98 provides interfacing between the CPU 100 and the I/O board 32.

Other types of memory circuits are used to provide data storage for the protocol adapter 30 when the protocol adapter 30 is being used to provide the streaming function, as described above. Because the protocol adapter 30 is storing data, as well as transferring data, the protocol adapter 30 also includes non-volatile memory. The non-volatile memory can include, but is not limited to, Compact Flash, USB memory sticks, Secure Digital (SD) cards, Read Only memory (ROM), hard disk drives, floppy disk drives, and magnetic tape.

Other features of the present invention are shown as a graphical representation in FIGS. 10-16. The protocol adapter 30 also includes a channel matrix tool 122. The channel matrix 122 allows for providing custom routing configurations using the basic building blocks available. The channel matrix tool 122 is configured via a serial interface with the use of a software program (such as a Windows-based program) which allows the channel matrix tool 122 to communicate with both the external device 14 and the in-vehicle networks 12. The configuration is stored in the non-volatile memory and recalled on demand at power up of the protocol adapter 30.

The channel matrix 122 includes additional features for receiving data from serial devices/networks and transmitting the data onto a channel network. The device is designed to minimize latency from the time the serial message is received to when it appears on the Channel bus.

Output ports can be used as triggers based on receiving a specific message. The ports can be set to toggle messages, one shot trigger only, or pulse the output for a pre-determined time duration.

Figure 10:
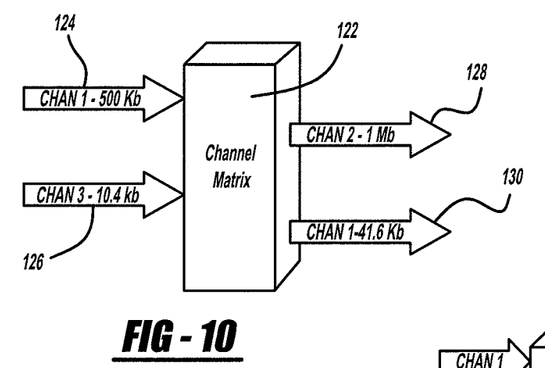
FIG. 10 is a graphic representation of a channel matrix functioning as a channel data rate converter which receives data being transferred at one bit rate and transmits the data at another bit rate, used in a protocol adapter according to the present invention.

Referring to FIG. 10, the channel matrix 122 functions as a channel data rate converter. With regard to this function, the channel matrix 122 includes a first input channel 124 and a second input channel 126, as well as a first output channel 128 and a second output channel 130. When performing this type of function, the channel matrix 122 receives channel data from the input channels 124,126 at one bit rate and transmits the data through the output channels 128,130 at a different bit rate. For example, the first input channel 124 is transferring data at 0.5 Mb, and the first output channel 130 is transferring data at 1.0 Mb, while the second input channel 126 is transferring data to the channel matrix 122 at 10.4 Kb, and the second output channel 130 is transferring data at 41.6 Kb. It should be recognized that this embodiment is not limited to having only the two input channels 124,126, and two output channels 128,130. More or less input and output channels may be used, along with different bit rates of data transmission.

Figure 11:
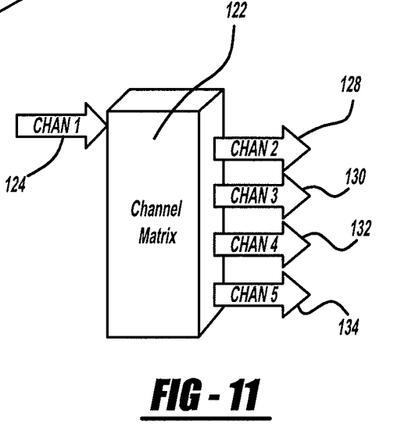
FIG. 11 is a graphic representation of a channel matrix functioning as a channel replicator which receives data from an input channel and transmits the data on multiple output channels, used in a protocol adapter according to the present invention.

Referring to FIG. 11, the channel matrix 122 can also function as a channel replicator, where the channel matrix 122 receives data from one input channel and transmits the data on multiple output channels. As shown in FIG. 11, the channel matrix 122 includes the first and second output channels 128,130, but additionally has a third output channel 132 and a fourth output channel 134. Data is received from the first input channel 124, and transmitted to the output channels 128,130,132,134. This function may be combined with the channel data rate converter to send out data at different bit rates than the rate of data transmission of the first input channel 124. Also, more or less output channels may be used aside from the four output channels 128,130,132,134 shown in FIG. 11, each of which can have a specific bit rate of data transfer.

Figure 12:
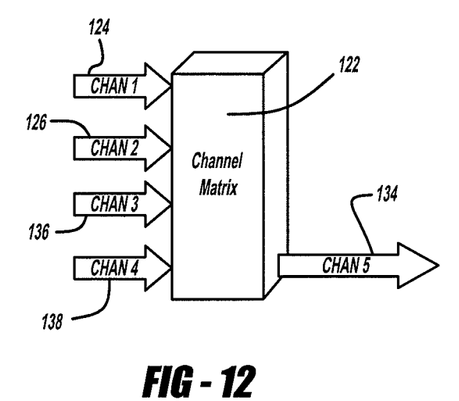
FIG. 12 is a graphic representation of a channel matrix functioning as a channel multiplexer which receives data from multiple input channels and transmits them on one output channel, used in a protocol adapter according to the present invention.

Referring to FIG. 12, the channel matrix 122 also functions as a channel multiplexer. The channel matrix 122 receives mixed signal data from multiple input channels and integrates them for transmission on one single output channel. As shown in FIG. 12, the channel matrix 122 receives data from the first and second input channels 124,126, but also includes a third input channel 136 and a fourth input channel 138. Data transferred in through the input channels 124,126,136,138 to the channel matrix 122 is transferred out through a single output channel, which in this embodiment is the fourth output channel 134. Data rates from the various input channels may be different from one another. Again, more or less input channels can be used which may have the same or different bit rates for transferring data than what is shown by the four input channels 124,126,136,138 in FIG. 12.

Figure 13:
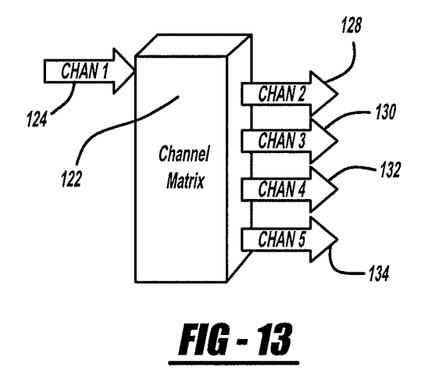
FIG. 13 is a graphic representation of a channel matrix functioning as a channel disassembler which receives data from one input channel, and transmits data on multiple output channels, used in a protocol adapter according to the present invention.

The channel matrix 122 also functions as a channel disassembler, as shown in FIG. 13. In this embodiment, the channel matrix 122 receives data from one input channel, in this case the first input channel 124. The channel matrix 122 then separates the data by message or signal I.D. and sorts out which data is to be transmitted out on the various output channels 128,130,132,134. More or less output channels may be used than the four output channels 128,130,132,134 shown in FIG. 13, and different bit rates may be used on the various output channels.

Figure 14:
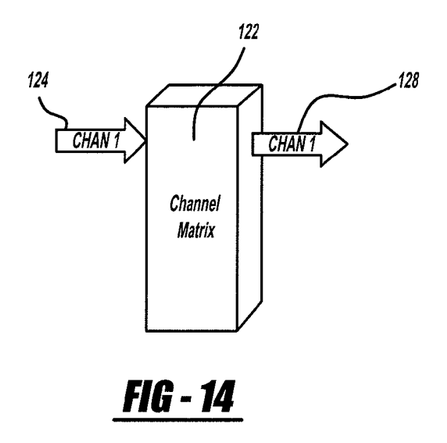
FIG. 14 is a graphic representation of a channel matrix functioning as a channel echo which echoes data for verification, used in a protocol adapter according to the present invention.

The channel matrix 122 also functions as a channel echo (i.e. provides feedback) as shown in FIG. 14. Data in any form, i.e., messages, signals, raw data, Boolean information, etc., may be echoed back onto the bus for verification of signal integrity, file match characteristics, or connectivity validation. As shown in FIG. 14, data is transferred to the channel matrix 122 on the first input channel 124, and is echoed back through the first output channel 128.

Figure 15:
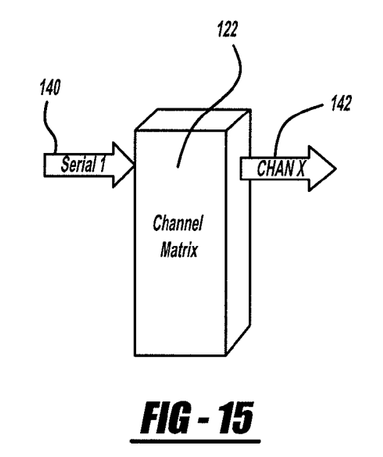
FIG. 15 is a graphic representation of a channel matrix functioning as a serial converter which converts data from one format to another, used in a protocol adapter according to the present invention.

Referring to FIG. 15, the channel matrix 122 also functions as a serial converter. To perform this function, data from any serial device will be converted to the appropriate format for the network that the data is being transmitted to, whether it is an event driven network, time allocated network, or continuous data feed (data streaming). As shown in FIG. 15, the channel matrix 122 is connected to any device through a serial connection 140. The channel matrix 122 converts the data to the desired format, and the data is then transferred through one of the output channels 128,130,132,134 as mentioned above, or through another output channel 142. Different bit rates may be used when transferring data from the serial connection 140 to the output channel 142.

Figure 16:
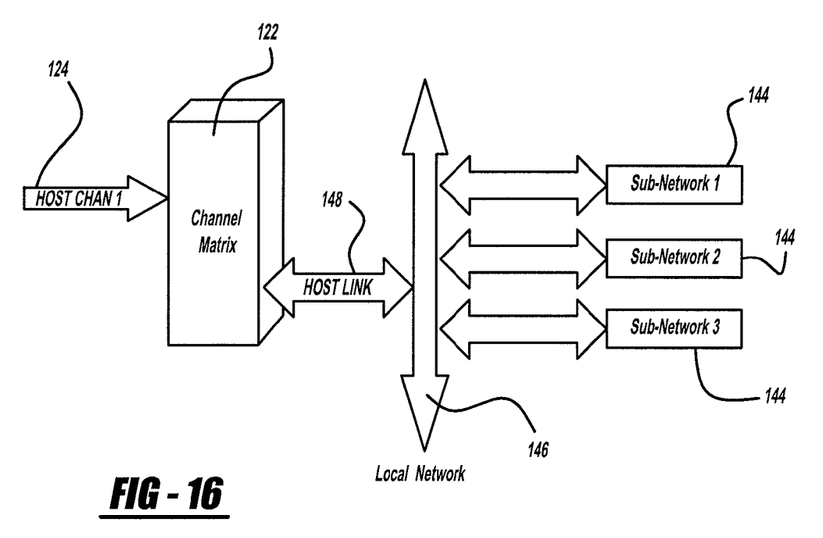
FIG. 16 is a graphic representation of a channel matrix functioning as a selective one-way data transfer which allows data from a host channel to be transferred to subordinate data networks, used in a protocol adapter according to the present invention.

Referring to FIG. 16, the channel matrix 122 also functions to perform selective one-way data transfer. As shown in FIG. 16, the channel matrix 122 will transfer data to a series of sub-networks 144. When performing this function, data from a host channel, shown in FIG. 16 as the first input channel 124, is transferred to the sub-networks 144 through a subordinate data network 146. The subordinate data network 146 interfaces with the channel matrix 122 without interference from the subordinate data network 146. The sub-networks 144 of the subordinate network 146 still communicate normally between each other and with their own host controller; however, no communication from the sub-networks 144 reaches the first input channel 124 except those allowed by the channel matrix 122. The channel matrix 122 communicates with the subordinate data network 146 through the use of a host link 148.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A protocol adapter for transferring diagnostic messages between two or more vehicle networks and at least one external host computer, said adapter comprising:
   a channel matrix tool for providing communication of diagnostic messages that are any signals for monitoring a vehicle network within the vehicle for diagnostics and maintenance purposes, said communication occurs between said two or more vehicle networks and said at least one external host computer, wherein the channel matrix tool includes custom routing configurations that are configured via a serial interface with use of a software program that allows the channel matrix tool to communicate with both the external host computer and the two or more vehicle networks;
   one or more output ports of the channel matrix tool, said one or more output ports are used as triggers based on receiving a specific message;
   a central processing unit (CPU), said CPU controlling the operation of said channel matrix tool; and
   a non-volatile memory for providing storage of data received from said two or more vehicle networks.

2. The protocol adapter according to claim 1, wherein said protocol adapter transfers and logs said data simultaneously.

3. The protocol adapter according to claim 2, wherein said protocol adapter records said data from said two or more vehicle networks, simultaneously transfers said data to said at least one external host computer, and said at least one external host computer records said data.

4. The protocol adapter according to claim 2, wherein said data logged by protocol adapter is transferred to said at least one external host computer once connection is reestablished, when the connection between said protocol adapter and said at least one external host computer is disconnected.

5. The protocol adapter according to claim 1, wherein said protocol adapter acts as a multiplexer having multiple inputs to a single output, a single input to multiple outputs, or any combination therebetween.

6. The protocol adapter according to claim 1, wherein said channel matrix tool provides a streaming data function between said two or more vehicle networks and said at least one external host computer.

7. The protocol adapter according to claim 1, wherein said protocol adapter is a channel data rate converter, comprising:
   at least one input channel for transferring said data to said channel matrix tool; and
   at least one output channel, wherein said channel matrix tool receives said data from said at least one input channel at a first bit rate and transmits the data through said at least one output channel at a second bit rate, said first bit rate being different from said second bit rate.

8. The protocol adapter according to claim 1, wherein said protocol adapter is a channel replicator, comprising:
   at least one input channel for transferring said data to said channel matrix tool; and
   a plurality of output channels, wherein said channel matrix tool receives said data from said at least one input channel and transfers said data to said plurality of output channels.

9. The protocol adapter according to claim 8, wherein said data is transferred from said at least one input channel at a first bit rate, and said data is transferred to said plurality of output channels at multiple bit rates.

10. The protocol adapter according to claim 1, wherein said protocol adapter is a channel multiplexer, comprising:
    a plurality of input channels for transferring said data to said channel matrix tool; and
    a single output channel for transferring said data away from said channel matrix tool sent to said channel matrix tool by said plurality of input channels.

11. The protocol adapter according to claim 10, wherein said data is transferred at one or more bit rates through said plurality of input channels.

12. The protocol adapter according to claim 1, wherein said protocol adapter is a channel disassembler, comprising:
    at least one input channel for transferring said data to said channel matrix tool;
    a plurality of output channels for transferring said data away from said channel matrix tool, wherein said channel matrix tool separates and directs which parts of said data received by said channel matrix tool from said plurality of input channels to said plurality of output channels.

13. The protocol adapter according to claim 12, wherein said data is transferred at one or more bit rates through said plurality of output channels.

14. The protocol adapter according to claim 1, wherein said protocol adapter is a channel echo, comprising:
- at least one input channel for transferring said data to said channel matrix tool; and
- at least one output channel, wherein said channel matrix tool receives said data from said at least one input channel and said data is transferred through said at least one output channel.

15. The protocol adapter according to claim 1, wherein said protocol adapter is a serial converter, comprising:
- at least one input channel for transferring said data to said channel matrix tool in a first format; and
- one or more output channels, wherein said channel matrix tool converts said data to a second format and said data is transferred through said one or more output channels in said second format.

16. The protocol adapter according to claim 1, wherein said protocol adapter performs selective one-way data transfer comprising:
- at least one input channel for transferring said data to said channel matrix tool;
- a subordinate network which transfers said data to and from said channel matrix tool; and
- a plurality of sub-networks configure for communication with one another, each of said plurality of sub-networks having a host controller, wherein each of said plurality of sub-networks is configured for receiving said data from and transferring data to said subordinate data network.

17. The protocol adapter according to claim 16, further comprising:
- said at least one input channel further comprising a host channel, wherein said plurality of sub-networks communicate with said host channel though said channel matrix tool; and
- a host link, wherein said channel matrix tool communicates with said subordinate network through the use of said host link.

18. A protocol adapter for transferring diagnostic messages between two or more vehicle networks and at least one external host computer, said adapter comprising:
- a channel matrix tool for providing communication of diagnostic messages that are any signals for monitoring a vehicle network within the vehicle for diagnostics and maintenance purposes, said communication occurs between said two or more vehicle networks and said at least one external host computer, wherein the channel matrix tool includes custom routing configurations that are configured via a serial interface with use of a software program that allows the channel matrix tool to communicate with both the external host computer and the two or more vehicle networks;
- at least one input channel configures for providing communication between said two or more vehicle networks and said channel matrix tool;
- at least one output channel configures for providing communication between said channel matrix tool and said at least one external host computer, wherein said at least one output port is used as a trigger based on receiving a specific language;
- a central processing unit (CPU), said CPU controlling the operation of said channel matrix tool; and
- a non-volatile memory for providing storage of data received from said two or more vehicle networks, thereby allowing said protocol adapter to provide a streaming data function and record data simultaneously.

19. The protocol adapter according to claim 18, wherein said protocol adapter is configured to record data from said two or more vehicle networks while simultaneously transferring data to said at least one external host computer such that said protocol adapter provides said streaming data function between said two or more vehicle networks and said at least one external host computer.

20. The protocol adapter according to claim 18, further comprising:
- a first bit rate, said at least one input channel configured for transferring data from said two or more vehicle networks and said channel matrix tool at said first bit rate; and
- a second bit rate, said at least one output channel configured for transferring data from said channel matrix tool and said at least one external host computer at said second bit rate.

21. The protocol adapter according to claim 20, wherein said first bit rate is different from said second bit rate.

22. The protocol adapter according to claim 18, said at least one input channel further comprising multiple input channels for providing communication between said two or more vehicle networks and said channel matrix tool, said multiple input channels configured for transferring data at one or more bit rates.

23. The protocol adapter according to claim 18, said at least one output channel further comprising multiple output channels for providing communication between said channel matrix tool and said at least one external host computer, said multiple output channels configured for transferring data at one or more bit rates.

24. The protocol adapter according to claim 23, wherein said channel matrix tool receives data from said at least one input channel, and directs various portions of said data to said multiple output channels.

25. The protocol adapter according to claim 23, wherein said channel matrix tool changes the format of data received by said channel matrix tool from said at least one input channel, such that data transferred through said at least one input channel is in a different format compared to the data being transferred through said multiple output channels.

26. The protocol adapter according to claim 18, said at least one input channel further comprising multiple input channels, and said at least one output channel further comprising multiple output channels, wherein said channel matrix tool is configured to transfer data from any of said multiple input channels to any of said multiple output channels.

27. The protocol adapter according to claim 26, wherein data is transferred from said multiple input channels to said multiple output channels at one or more bit rates.

28. The protocol adapter according to claim 18, further comprising:
- a subordinate network configured for transferring data to and from said channel matrix tool;
- a plurality of sub-networks configured for communication with one another and with said subordinate network, and each of said plurality of sub-networks also in communication with a respective host controller;
- said at least one input channel further comprising a host channel, wherein said channel matrix tool controls the communication between said host channel and said plurality of sub-networks; and
- a host link configured for providing communication between said channel matrix tool and subordinate network.

29. A protocol adapter for transferring diagnostic messages between two or more vehicle networks and at least one external host computer, said adapter comprising:
- a channel matrix tool for providing communication of diagnostic messages that are any signals for monitoring a vehicle network within the vehicle for diagnostics and maintenance purposes, said communication occurs between said two or more vehicle networks and said at least one external host computer, wherein the channel matric tool includes custom routing configurations that are configured via a serial interface with use of a software program that allows the channel matrix tool to communicate with both the external host computer and the two or more vehicle networks;

at least one input channel operable configured for transferring data from said two or more vehicle networks to said channel matrix tool at one or more bit rates;

at least one output channel configured for transferring data from said channel matrix tool to said at least one external host computer at said one or more bit rates, wherein the at least one output channel is used as a trigger based on receiving a specific message;

a central processing unit (CPU), said CPU controlling the operation of said channel matrix tool; and a non-volatile memory for providing storage of data received from said two or more vehicle networks.

30. The protocol adapter of claim 29, wherein said one or more bit rates used for transferring data through said at least one input channel is different compared to said one or more bits rates used for transferring data through said at least one output channel.

31. The protocol adapter of claim 29, wherein said protocol adapter is configured to provide a data streaming function between said two or more vehicle networks and said at least one external host computer while simultaneously recording data received from said at least one input channel, and said at least one external host computer is configured to record data received from said protocol adapter via said data streaming function.

32. The protocol adapter according to claim 29, further comprising:
said at least one input channel further comprising a plurality of input channels configured to provide electronic communication between said two or more vehicle networks and said channel matrix tool; and
said at least one output channel further comprising a plurality of output channels configured to provide electronic communication between said channel matrix tool and said at least one external host computer.

33. The protocol adapter according to claim 32, said one or more bit rates further comprising a first bit rate and a second bit rate, wherein data is transferred from said two or more vehicle networks to said channel matrix tool using said first bit rate, and data is transferred from said channel matrix tool to said at least one external host computer using said second bit rate.

34. The protocol adapter according to claim 32, wherein said channel matrix tool divides data received from said plurality of input channels, and distributes parts of said data to each of said plurality of output channels.

35. The protocol adapter according to claim 29, further comprising:
a plurality of sub-networks in configured communication with one another, each of said plurality of sub-networks having a host controller;
a subordinate network configured for transferring data between said plurality of sub-networks and said channel matrix tool;
a host link for providing electronic communication between said subordinate network and said channel matrix tool; and
said at least one input channel further comprising a host channel, wherein said channel matrix tool controls electronic communication between said host channel and said plurality of sub-networks.

* * * * *